(No Model.)
D. CRANE.
CULTIVATOR.
No. 306,133. Patented Oct. 7, 1884.
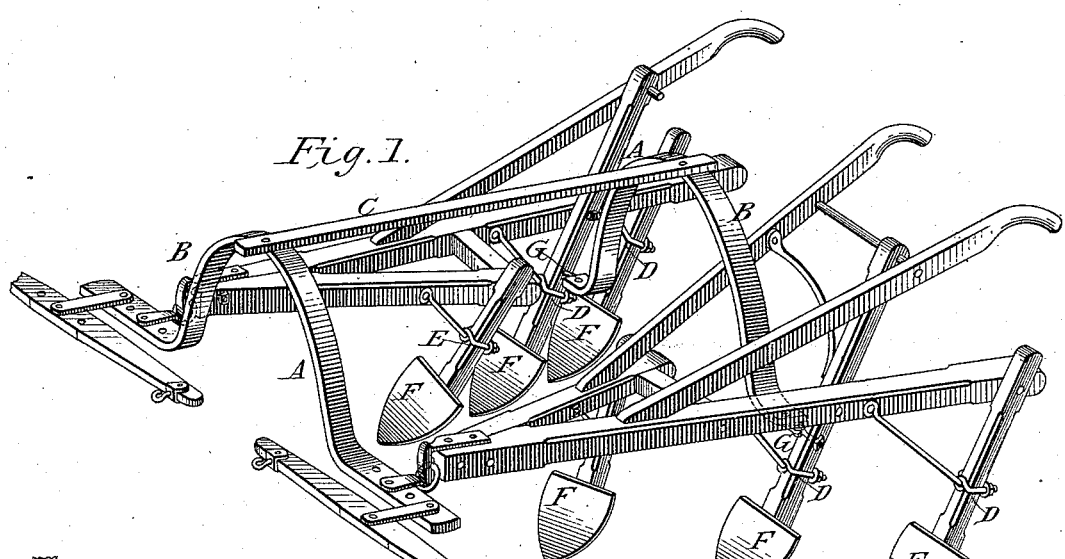
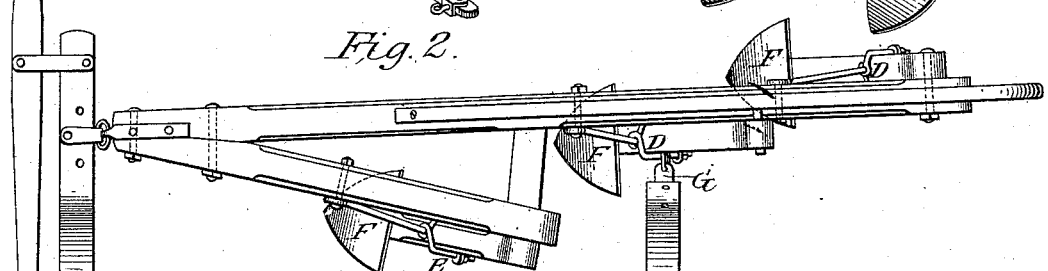
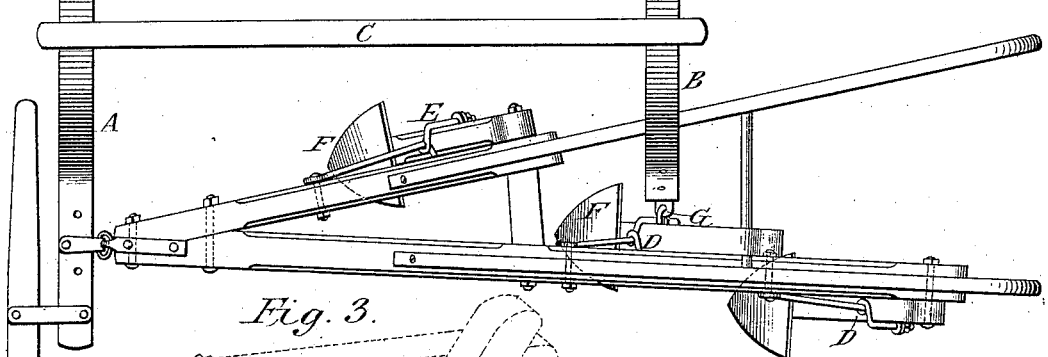

United States Patent Office.

DANIEL CRANE, OF WEST LIBERTY, IOWA.

CULTIVATOR.

SPECIFICATION forming part of Letters Patent No. 306,133, dated October 7, 1884.

Application filed February 16, 1884. (No model.)

*To all whom it may concern:*

Be it known that I, DANIEL CRANE, a citizen of the United States, residing at West Liberty, in the county of Muscatine and State of Iowa, have invented a new and useful Machine, a Cultivator, of which the following is a specification.

My invention relates to improvements in cultivators, which is a combination of two distinct single plows having three shovels each and no wheels.

Figure 1 is a vertical view of the combined cultivator as it appears in operation. Fig. 2 is a top view of the same. Fig. 3 is a representation of the clamp-stay used to stay the shovel-standards. By raising or lowering the said clamp the depth of the plowing is regulated.

Similar letters refer to similar parts throughout the several views.

The cultivator is composed of two separate and distinct single plows. The single plows are intended to be used in gardens or orchards, &c., where the double plow would be inconvenient.

The combined cultivator is formed by the union of these single plows, and are connected by my frame A B and A B and C. The frame is attached to the plows to form the combined cultivator, first, by the bolts G G, passing through the middle standard of each single plow, forming a knuckle or hinge, which is placed at the proper distance on said standards to form a lever for the operator, by means of which he is enabled to direct the plows without lifting them out of the ground, and with very little physical exertion; second, by the cross-bar A B, which is made of sufficient dimensions to give it stiffness and strength, and is perforated with several holes on each end, so as to remove the small bolt or clevis thereon, out or in, at the will of the operator, to regulate the distance between the plows, thereby enabling the operator to plow the distance from the corn he desires. The draft-power is applied to the front arched bar, A B, which, by rings and clevises, is attached to the main beam of each single plow, making a complete evener. The bar C connects the arched bars A B and A B in such a manner as to permit free and easy turning at the ends of the field, or one horse to walk in advance of the other without shifting the burden upon the other horse or giving the operator any inconvenience. The frame is of sufficient height to admit the plants to pass under same without injury to them. The teeth F F, in advance on each single plow, are fastened on the vertical standards E E with a slight bevel inward for the purpose of throwing the earth to the plants. To reverse the direction of the earth, the said vertical standards are inverted and the shovels fastened on the other end of same, which has the bevel the reverse. The draft of this cultivator is not so great as the four-shovel cultivator with wheels, and having six shovels does its work much more effectually. When the single plows are used, an extra handle is added, as shown in the cut, No. 7, on the left plow.

What I claim Letters Patent on as my invention and improvement in cultivators is—

The combination, in a double cultivator, of the frame A A, the arched cross-bars B B, connected to said frame by flexible joints, and the longitudinal bar C, pivoted to the arched cross-bars, as shown and described.

DANIEL CRANE.

Witnesses:
H. F. BONORDEN,
JAMES HILL.